United States Patent [19]

Sordello

[11] 3,728,699

[45] Apr. 17, 1973

[54] APPARATUS FOR SYNCHRONIZING OSCILLATION OF READ/WRITE HEADS WITH THE ROTATION OF A DATA STORAGE DISC PACK

[75] Inventor: Frank J. Sordello, San Jose, Calif. 95123

[73] Assignee: Information Storage System, Inc., Cupertino, Calif.

[22] Filed: Aug. 16, 1971

[21] Appl. No.: 172,141

[52] U.S. Cl. ............................340/174.1 C, 346/137

[51] Int. Cl. ..............................................G11b 5/00

[58] Field of Search .................340/174.1 B, 174.1 C; 346/74 MD, 137; 274/41.4

[56] References Cited

UNITED STATES PATENTS

| | | | |
|---|---|---|---|
| 3,126,535 | 3/1964 | Streeter | 340/174.1 C |
| 3,427,606 | 2/1969 | Black et al. | 340/174.1 B |
| 2,862,389 | 12/1958 | Potter | 340/174.1 C |
| 3,177,476 | 4/1965 | Robinson | 340/174.1 C |
| 3,208,057 | 9/1965 | Applequnt, Sr. et al. | 340/174.1 C |

OTHER PUBLICATIONS

"Time Base Compression for Video Recording" by Lawrence et al., IBM Tech. Disc. Bul. Vol. 13, No. 4 Sept. 1970

*Primary Examiner*—Vincent P. Canney
*Attorney*—C. Michael Zimmerman and Gerald L. Moore

[57] ABSTRACT

Apparatus is described for oscillating the read/write head carriage of a rotary drive mechanism for data storage disc pack. An optical sensing device is employed to determine the angular phase and frequency of rotation of the disc pack, and a phase discriminator compares the sensed frequency with the output of an oscillator to phase-lock the oscillator thereto. The resulting oscillation signal is fed to an electromagnetic actuator to cause oscillation of the read/write head in synchronism with the rotation of the disc pack.

6 Claims, 1 Drawing Figure

PATENTED APR 17 1973 3,728,699

INVENTOR.
Frank J. Sordello
BY
C. Michael Zimmerman
ATTORNEY

APPARATUS FOR SYNCHRONIZING OSCILLATION OF READ/WRITE HEADS WITH THE ROTATION OF A DATA STORAGE DISC PACK

BACKGROUND OF THE INVENTION

This invention relates to direct access data storage devices and, more particularly, to apparatus for oscillating a data transfer device, e.g., a read/write head, in a predetermined manner related to the rotation of a data storage device such as a pack of magnetic discs.

As the speed of the central processing units of computers has increased, there has been a strong demand that the speed with which data or information is transferrable between data storage devices and a computer be correspondingly increased. For this reason, direct access data storage devices of the type employing a pack of rotating magnetic discs for memory are being widely adopted. Such devices have the advantage of enabling information to be either transferred to, or removed from, randomly selected locations or addresses without the necessity of the device having to serially "seek" the desired location such as must be done with, for example, magnetic tape memories.

It will be appreciated that for a random access disc pack storage device to be effective, one must be able to quickly and precisely position the read/write heads at specified address locations with respect to the recording discs. For this reason, sophisticated positioning apparatuses and position sensing systems, such as that described in the now abandoned U.S. Pat. application, Ser. No. 63,508 entitled "Position Sensor" – T. W. Martin et al., filed Aug. 13, 1970, have been developed. Precise positioning systems of this nature need to be continually calibrated in view of their reliable on light sources and sensors which have somewhat variable outputs. It has been the practice in order to obtain this calibration to slightly "wiggle" or oscillate the read/write head carriage. This slight oscillation imposes controlled variations on the outputs of the various photo sensing devices and enables a comparison of the same to correct for undesired discrepancies.

Oscillation of the read/write head carriage also causes the heads themselves to oscillate with respect to the recording discs. Because their oscillation has been slight, e.g., ±128 micro-inches, it has, in the past, been acceptable. That is, the oscillation of each head with respect to the optimum positioning of the head on a disc recording track has not prevented the head from either picking up data previously recorded on the track or from writing data onto the track. However, the oscillation has required that adjacent tracks be spaced apart a distance sufficient to prevent overlapping of tracks or, in other words, "crosstalk."

As man's usage of computers and other data utilization devices has increased, the demand for greater data storage capabilities has also grown. For this reason, those in the art have been desirous of spacing adjacent tracks on recording discs as close together as they can. Much effort has been devoted to this end. Most of such effort, however, has been directed to eliminating the necessity of the "wiggle," either by attempting to develop other positioning sensing systems not requiring calibration for accuracy, or by developing other calibration schemes. Such efforts, though, have not yielded the performance that the "wiggle" method has.

SUMMARY OF THE INVENTION

The present invention eliminates the problem of track overlapping while still enabling a "wiggle" for calibration purposes to be superimposed on the read/write head carriage. It accomplishes this by synchronizing the head carriage oscillation with the angular frequency of rotation of the discs in such a manner that each read/write head always describes the same path with respect to its associated disc at each track radial position, and so that all radial track positions of the head on the disc are concentric and uniformly shaped. To these ends, the apparatus of the invention broadly includes means for sensing the angular phase and frequency of a rotating storage device, e.g., a pack of rotating magnetic discs. It further includes means responsive to the sensed angular phase and frequency by causing the frequency of the oscillation signal which drives the head carriage in the desired oscillatory motion to be related to such angular phase and frequency in a predetermined manner. This results in the oscillatory motion of the read/write heads to also be related in a predetermined manner to the angular phase and frequency of the rotating disc pack. Because of such, the adjacent tracks of each read/write head on its corresponding disc can be made to uniformly follow one another, at set distances apart, rather than oscillate with respect to one another.

Most desirably, the predetermined relationship between the rotation of the disc pack and oscillation of the head carriage is obtained by synchronizing the phase of the oscillation signal driving the head carriage with the angular phase and frequency of rotation of the disc pack. This will assure that the desired relationship between adjacent tracks, and time-spaced seeks on the same track, is most simply obtained.

BRIEF DESCRIPTION OF THE DRAWING

With reference to the accompanying sheet of drawing:

The single FIGURE is a schematic and block diagram of a preferred embodiment of the synchronizing apparatus of the invention.

DESCRIPTION OF THE PREFERRED EMBODIMENT

Figure 1:
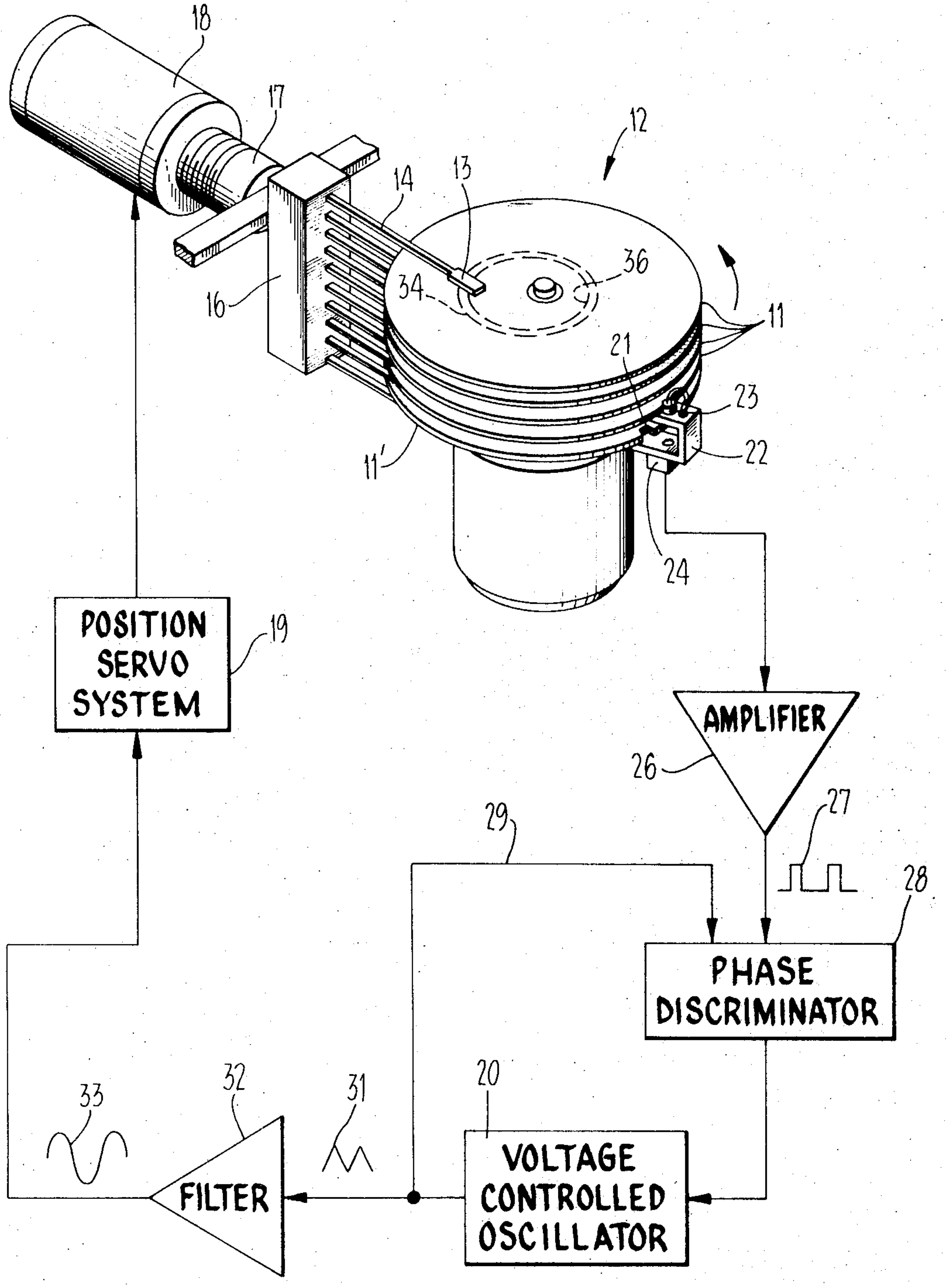

With reference to the drawing, a plurality of discs 11, each one of which has its surfaces coated with a magnetic material, are illustrated coaxially secured together to form a disc pack 12. In use, the disc pack 12 is axially rotated, and data in digital form is selectively transferred onto or from tracks on the disc surfaces by corresponding data transfer devices in the form of read/write heads 13. As is illustrated, a head 13 is provided for each active disc surface, and each head is mounted on the free end of a support arm 14 therefor cantilevered from a carriage 16.

The carriage 16 is secured to the moving coil 17 of an electromagnetic actuator 18. The actuator 18 is energized by a position servo system, represented diagrammatically by block 19, to translate carriage 16, and, hence, the read/write heads 13 radially of the disc pack 12 and hold the same at various radial locations with respect to the disc surfaces. Each radial location of a head on a surface corresponds to a closed loop path or track of the head over the surface formed by rotation of the pack. Data is transferrable between each head and its associated disc surface on each one of such tracks.

It will be apparent that for proper and efficient operation, it is necessary that each of the heads be precisely positionable at its various track locations. Positioning and positioning sensing means for controlling the actuator 18, such as that disclosed in the previously mentioned application, Ser. No. 63,508, have been developed for this purpose. Such systems, though, require that the head carriage be oscillated slightly at each position thereof in order to assure that the sensing arrangement is properly calibrated. An oscillator 20 is therefore included to superimpose the desired oscillation on the position servo system.

Oscillation of the head carriage will cause a corresponding oscillation of each head with respect to its associated disc surface. As has been brought out previously, this slight oscillation has required that adjacent recording tracks be spaced some distance apart in order to prevent the oscillation or "wiggle" from causing the head, when it is positioned at a particular track, from crossing over onto adjacent tracks and either reading the wrong data from the disc or writing data onto the wrong track. This has placed a limit on the number of track positions available on a disc surface and, hence, a limit on the amount of data which can be stored on a surface.

In accordance with the present invention, apparatus is included for eliminating the necessity of adjacent tracks being spaced from one another an additional distance to permit the head carriage to be oscillated for calibration of the positioning sensing system. In this connection, means are provided for sensing the angular phase and frequency of rotation of the disc pack 12. That is, one of the discs, disc 11', is provided at a predetermined location with a discontinuity which can be sensed during rotation of the pack. In this preferred embodiment, the discontinuity is in the form of a slot or notch 21 extending radially inward of disc 11' a short distance from its outer peripheral edge. An optical sensor or transducer is positioned at a predetermined location with respect to disc 11' for indicating the passage thereby of the slot 21 during rotation of the disc pack. Such sensor includes a U-bracket 22 having a light emitting device, such as a solid state light source 23, on one leg thereof facing a light sensor, such as a photo transistor, on the other leg thereof. As is illustrated, the sensing device is positioned straddling the peripheral edge of disc 11' so that the disc edge blocks transmission of light between source 23 and sensor 24 except when the notch 21 passes therebetween. This will result in the photo sensor being energized to form an electrical pulse once every revolution of the disc 11' and, hence, once every revolution of disc pack 12. The phase and frequency of occurrence of such pulses, hereinafter called "index pulses," will thus indicate the angular phase and frequency of rotation of the disc pack 12. Specifically, such phase and frequency of occurrence will be equal to the angular phase and frequency of rotation of the disc pack.

The index pulses generated by the photo sensor 24 on rotation of the disc pack are fed into an amplifier 26 where the same are not only amplified, but also shaped to provide a more precise indication of their phase and frequency. The pulse signal emanating from the amplifier is schematically illustrated at 27.

The invention further includes means responsive to the sensed angular phase and frequency of the rotating storage device by causing the frequency of the output signal from oscillator 20 to be related in a predetermined manner to the frequency of rotation of the disc pack. That is, the output pulse signal from amplifier 26 is fed into a phase discriminator 28 which drives the oscillator 20. Such oscillator is a voltage controlled oscillator, and its output is also fed into the phase discriminator via feedback loop 29. The phase discriminator compares the phase of the output signal of the oscillator with the index pulses from amplifier 26 and phase locks the oscillator output to the phase and frequency of occurrence of the index pulses. This will result in the phase and frequency of the oscillation signal produced by the oscillator 20 being equal to the phase and frequency of occurrence of the index pulses and, hence, equal to the angular phase and frequency of rotation of the disc pack 12. This synchronism of the phase and frequency of the oscillation signal with the angular phase and frequency of the disc pack provides the desired relationship of the oscillatory motion of the lead carriage with the rotation of the disc pack.

As is indicated by the reference numeral 31, the output oscillation signal from oscillator 20 is in the form of a sawtooth wave. In order to prevent the sharp changes in direction of such signal from causing abrupt changes in the direction of mechanical oscillation of the heads 13, the sawtooth signal is passed through a filter 32 which converts the same into a generally sinusoidal waveform 33 for superimposition on the position servo system 19. It should be noted that although a sinewave is used in this embodiment, other types of oscillation waveforms, such as the sawtooth waveform directly or even a square waveform, may be used.

The dotted line circles 34 and 36 on the upper surface of the top disc 11 represent two adjacent tracks which are produced when the oscillation of the heads 13 is synchronized with the phase and frequency of rotation of the disc pack in accordance with this preferred embodiment of the invention. As is illustrated, the tracks are concentric circles which are eccentric with respect to the axis of rotation of the disc pack. The circular track form is caused because the frequency of the oscillation is equal to the angular frequency of rotation of the disc pack. The eccentricity of such circles is caused by the oscillation. That is, the movement of each head through one cycle of oscillatory motion as the disc pack rotates one revolution results in the track of the head describing a circle on the surface whose center is spaced a distance equal to one-half the amplitude of the oscillation from the axis of rotation of the discs.

In accordance with the preceding description of the invention, each recording head is moved radially with respect to the disc as the disc rotates. The radial movement of the head is the same both in magnitude and direction at the same radial position of each recording track thereby allowing for an increase in track density over prior recording devices. The increased track density is possible because the oscillatory motion of each head is in phase with the phase of the rotation of the disc pack. As a result the adjacent circular tracks will all be eccentric in the same direction, i.e., have the same center. Thus, problems of track overlapping and consequent "crosstalk" are obviated, and adjacent tracks can be positioned quite close together. In fact, utilization of the invention in one particular disc drive mechanism has substantially contributed to the elimination of total off-track tolerances such that the number of tracks per radial inch which can be written on a disc surface was doubled without crosstalk.

It will be recognized by those skilled in the art that various changes can be made within the scope of the invention. For example, although for simplicity it is preferred that the oscillation of the heads be equal in both frequency and phased to the angular phase and frequency of rotation of the disc pack, this is not necessary from the broad standpoint. Such oscillation frequency could be multiples of the angular frequency of rotation of the disc pack, as long as an appropriate phase relationship was maintained to assure that the heads will follow the same track whenever positioned at any particular track location. Moreover, although it is preferred to continually monitor the angular phase and frequency of the disc pack so that any changes in its frequency can be reflected in the oscillatory motion of the heads, one could also merely "spot-check" the angular phase and frequency of the disc pack and set the oscillatory motion of the heads accordingly.

I claim:

1. Apparatus for oscillating a data transfer device with respect to a rotating data storage device comprising means for sensing the angular phase and frequency of said rotating storage device, means for generating an oscillation signal, means responsive to the sensed angular phase and frequency of said rotating storage device by causing the phase and frequency of the oscillation signal to be related in a predetermined manner to the phase and frequency of rotation of said storage device during each rotation of the storage device, and means for converting the resulting oscillation signal into corresponding oscillatory motion of said data transfer device with respect to said storage device whereby the oscillatory motion of said data transfer device is also related in a predetermined manner to the angular frequency of said rotating storage device.

2. The apparatus of claim 1 for oscillating a data storage device wherein said means for sensing the angular phase and frequency of said rotating storage device continually senses the same during oscillation of said data transfer device, and said means responsive to the sensed angular phase and frequency of said rotating storage device maintains the phase and frequency of the oscillation signal in said predetermined relationship to the phase and frequency of rotation of said storage device during oscillation of said data transfer device.

3. The apparatus of claim 1 for oscillating a data transfer device wherein said means for converting the resulting oscillation signal into corresponding oscillatory motion of said data transfer device produced oscillatory motion of said data transfer device having substantially the same frequency as the frequency of said rotating storage device.

4. The apparatus of claim 1 for oscillating a data transfer device wherein said data storage device comprises a pack of coaxial magnetic disks which are axially rotated, and said means for sensing the angular phase and frequency of said rotation thereof includes an optical transducer responsive to the passage thereby of a discontinuity in one of said discs by generating a signal indicative of the angular phase and frequency of rotation of said pack.

5. The apparatus of claim 4 for oscillating a data transfer device wherein said means responsive to the sensed angular phase and frequency of said rotating data transfer device includes a phase discriminator for phase locking the output of said means for generating an oscillation signal to the frequency of the signal generated by said optical transducer to thereby phase lock said output with the phase and frequency of rotation of said disc pack to provide said predetermined relationships between the frequency and phase of the disc pack rotation and oscillatory motion of the data transfer device.

6. The apparatus of claim 5 for oscillating a data transfer device wherein means are provided for filtering the output signal of said means for generating an oscillation signal to produce a sinusoidal waveform therefrom for direction to said means for converting said oscillation signal into oscillatory motion of said data transfer device.

* * * * *